UNITED STATES PATENT OFFICE.

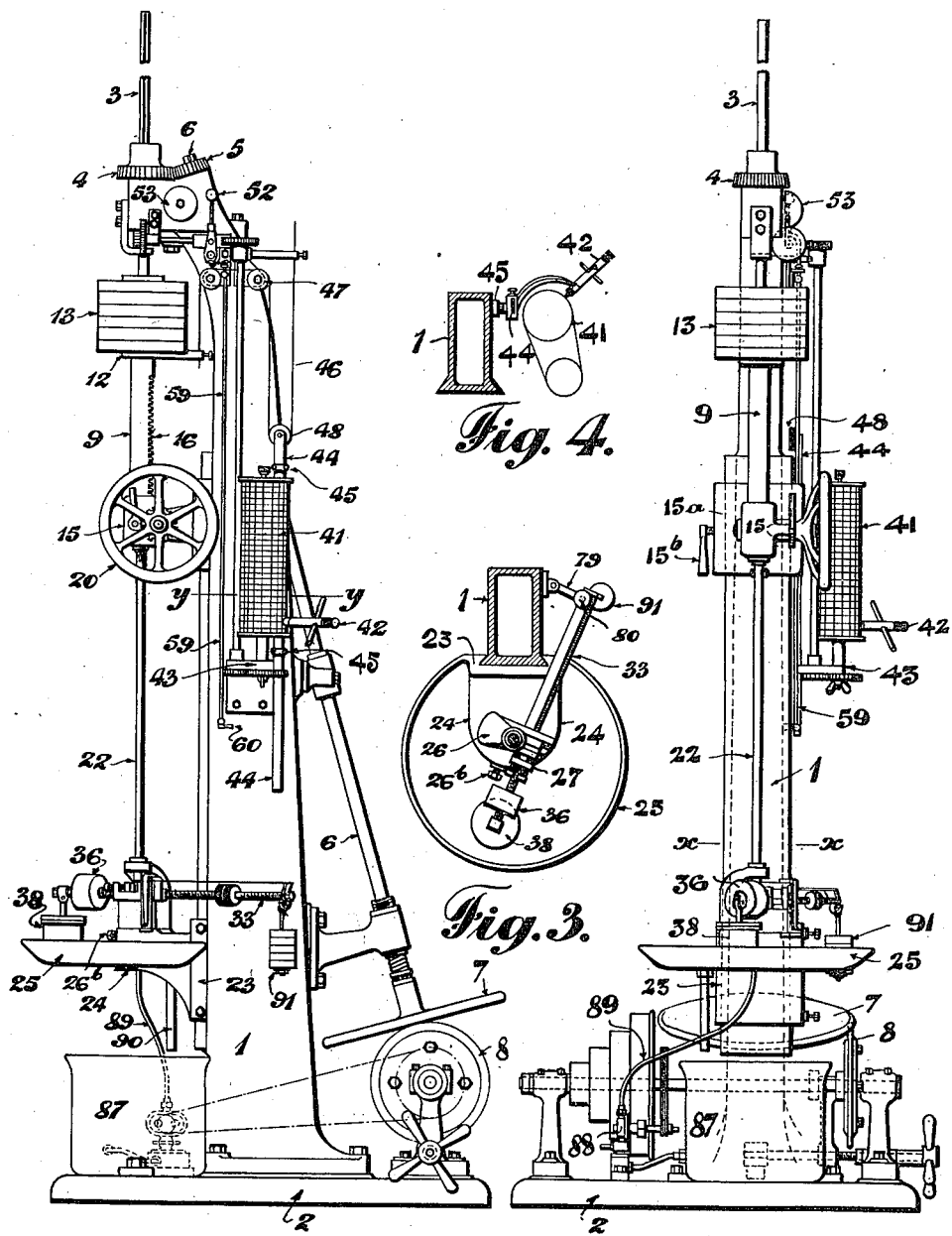

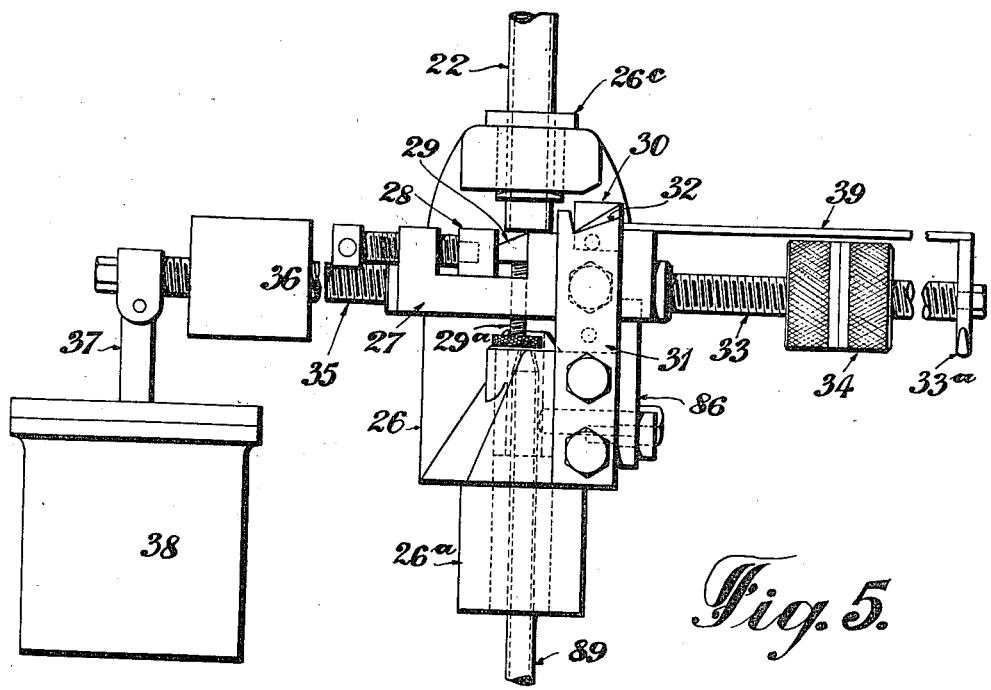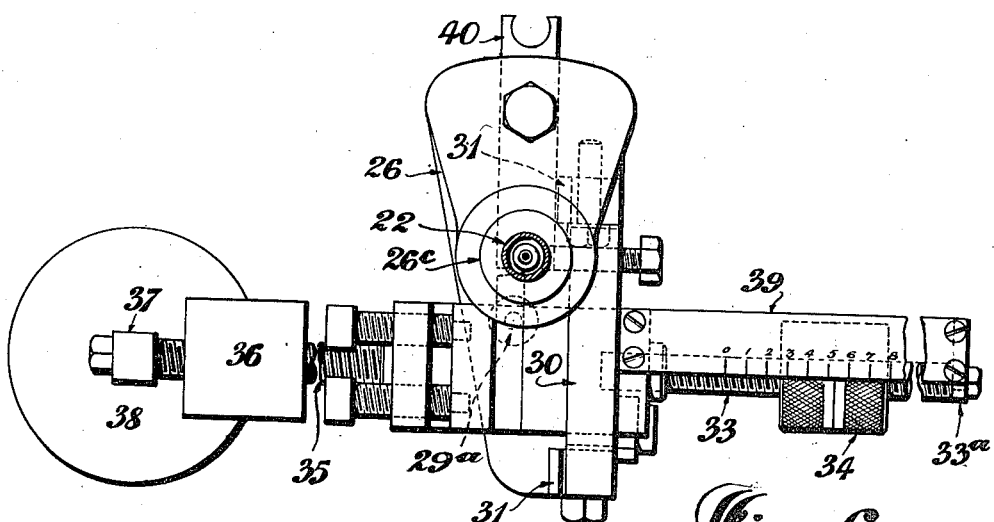

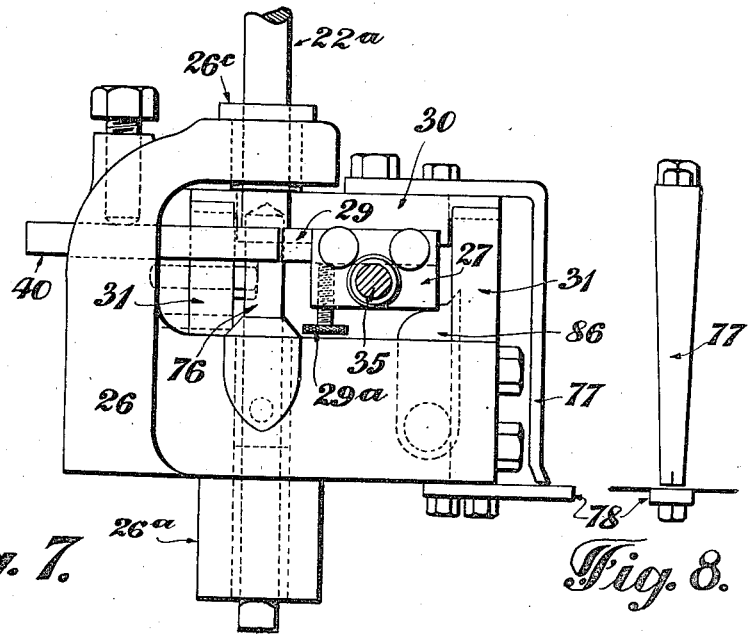
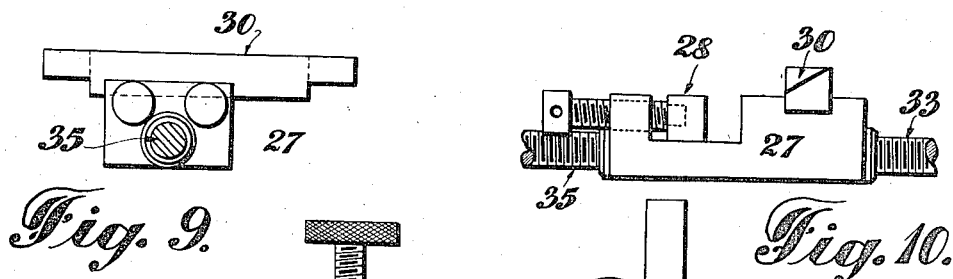
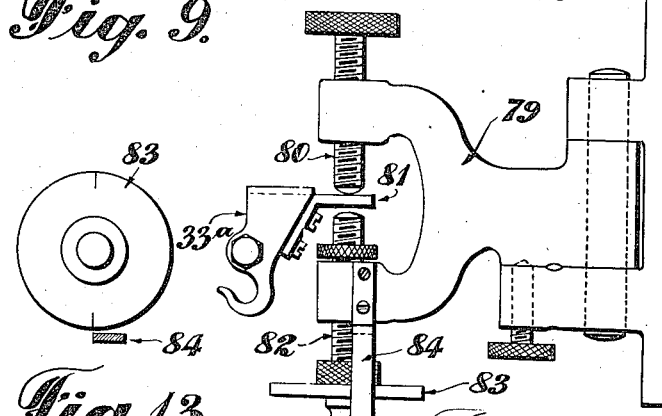

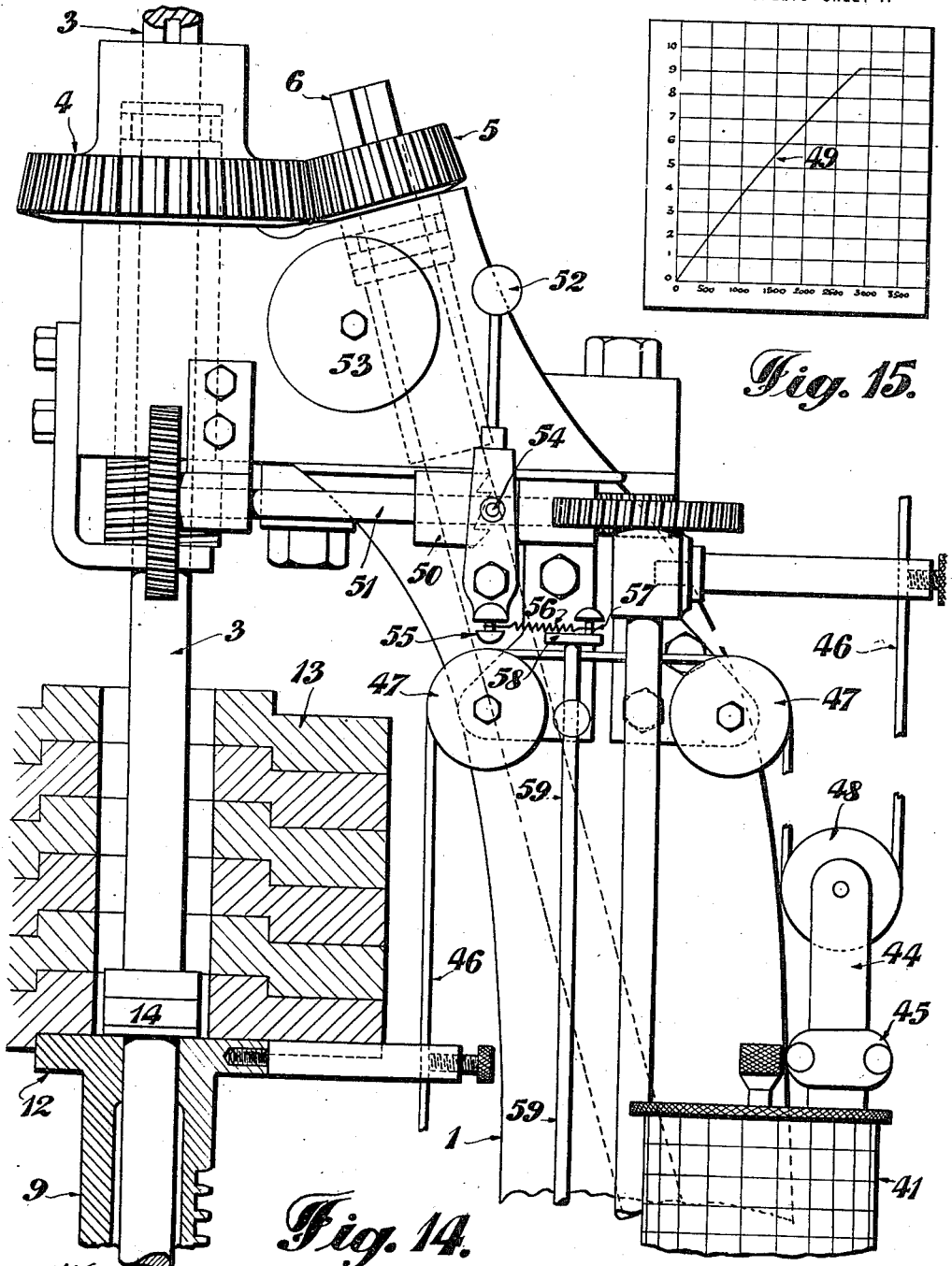

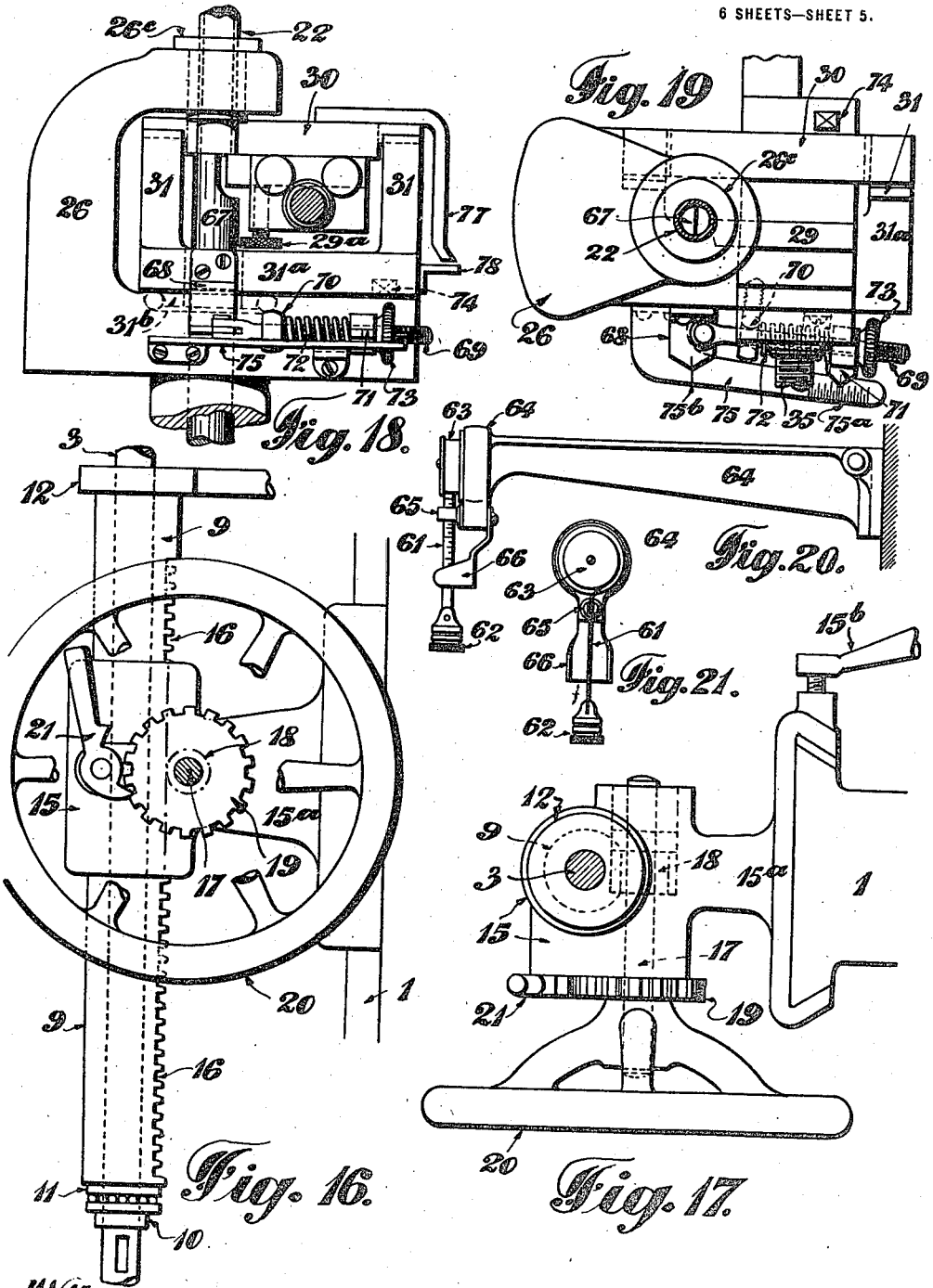

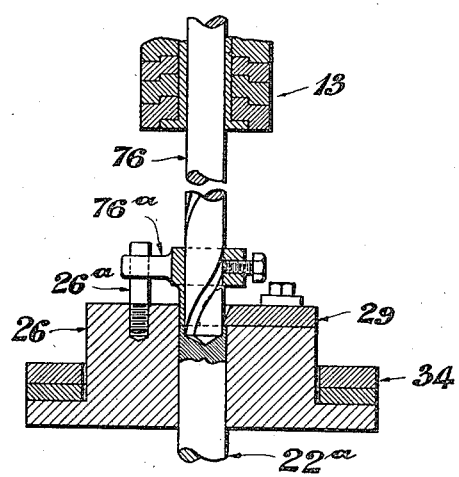
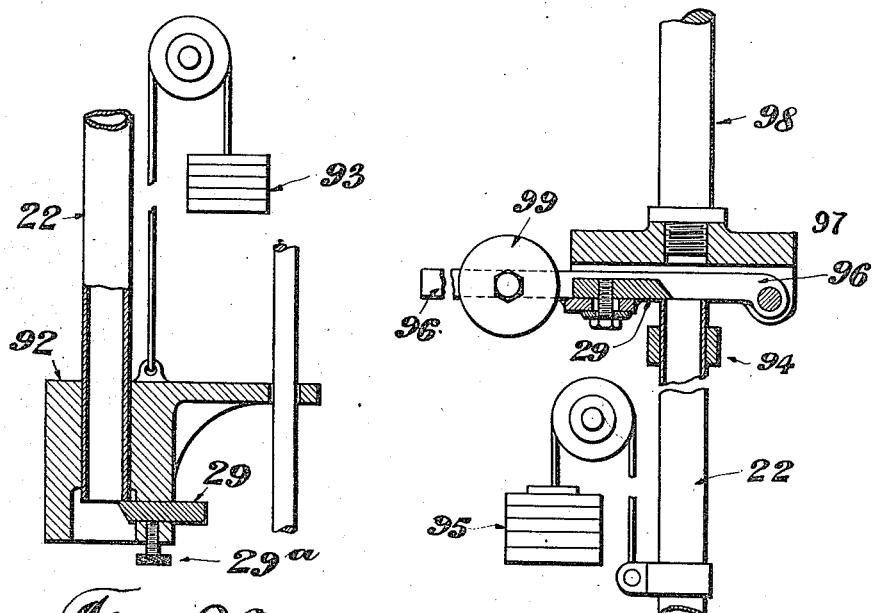

EDWARD G. HERBERT AND CHARLES FLETCHER, OF MANCHESTER, ENGLAND.

MACHINE FOR TESTING THE CUTTING QUALITIES OF TOOL-STEEL.

1,176,291.     Specification of Letters Patent.     Patented Mar. 21, 1916.

Application filed July 17, 1909. Serial No. 508,243.

*To all whom it may concern:*

Be it known that we, EDWARD GEISLER HERBERT and CHARLES FLETCHER, both subjects of the King of Great Britain and Ireland, and residents of Manchester, England, have invented a new or Improved Machine for Testing the Cutting Qualities of Tool-Steel, chiefly for use in testing the cutting efficiency of tool steel, of which the following is a specification.

This invention relates to a new or improved construction of automatic and autographic testing machine chiefly for use in testing tool steel and mainly in regard to (*a*) its efficiency and durability in cutting various metals; (*b*) its efficiency and durability with various cutting angles; (*c*) its efficiency and durability with various cutting compounds or lubricants and consequently the value of such compounds or lubricants; (*d*) its efficiency and durability under various speeds upon the same metal on various metals; (*e*) its efficiency and durability under alterations of "feed" or speed. The machine may also be used for other testing purposes as for instance (*f*) testing the power absorbed by the tool when cutting.

In the testing of tool steel it is usual to determine the cutting efficiency by the amount of metal removed from a given object before the tool becomes blunt, and the common method of effecting a test is to feed the tool against and along a rotating cylindrical body, such as a solid shaft or spindle. With such method of testing there are various factors which go to make the test inaccurate, chiefly those of the decreasing diameters and varying peripheral speeds of the work, the unequal surfaces or areas on which the tool acts, and the difficulty of estimating or measuring the bluntness of the tool. To obtain reliable data it is desirable that the diameter of the work be constant and that the tool should act on a constantly equal face throughout the whole of the test; that the speed of the work and the pressure of the tool should be capable of regulation and measurement and of being kept constant; that means should be provided for drawing an autographic record of the test as it proceeds; and that the test should be stopped when the tool has reached a certain definite degree of bluntness.

The invention consists essentially of a machine designed to conform to the above conditions, and one example of which is shown on the accompanying drawings, in which—

Figure 1 illustrates a side elevation, and Fig. 2 a front elevation of the complete machine. Fig. 3 illustrates a cross-sectional plan (in part) of the machine on line *x*—*x*, and Fig. 4 illustrates a further cross-sectional plan (in part) on line *y*—*y*. Fig. 5 illustrates, to a larger scale, a front view, Fig. 6 a plan view, and Fig. 7 a side view of those parts of the machine by which the lower end of the "test" member and the tool to be tested are held during a test. Fig. 7 also illustrates an edge view of an attachment used with the tool holder for indicating the correct setting of the tool prior to a test. Fig. 8 illustrates a face view of such attachment. Figs. 9 and 10 illustrate end and side views respectively of the essential parts of the tool holder. Fig. 11 illustrates a side view of a micrometer gage used for the purposes hereinafter explained. Fig. 12 illustrates a front view, and Fig. 13 a plan of parts of said gage. Fig. 14 illustrates to a larger scale, a side elevation, partly broken away and partly in section, of the upper portion of the machine. Fig. 15 illustrates a diagram of a "test" made by the machine as to the cutting efficiency of a tool. Fig. 16 illustrates a side elevation, and Fig. 17 a plan of certain detail parts hereinafter described, portions of such parts being broken away to show them more clearly. Fig. 18 illustrates a side elevation, and Fig. 19 illustrates a plan of the tool holder combined with means for indicating the correct setting of the tool prior to a test, and with further means for indicating the degree of torque on the tool and therefore the power absorbed by the tool when cutting. Fig. 20 illustrates a side view, and Fig. 21 a front end view of a device for affording a visible indication of the speed of the test. Figs. 22, 23 and 24 illustrate modified arrangements of the essential parts used in testing.

The machine illustrated consists of a standard 1 mounted on a foot or base-plate 2 suitable for standing upon a floor. Rotatably mounted in the upper part of such standard is a spindle 3 upon which is mounted a gear wheel 4, the spindle being free to slide vertically and the wheel engaging the spindle to rotate it through the medium of a key engaging a long key-way in the spindle. Meshing with the wheel 4 is a further gear wheel 5 keyed to a shaft 6, which latter extends down to variable driving gear of any suitable type, but preferably such as will give a wide range of speeds. In the example given, the variable driving gear consists of friction disk wheels 7, 8, the wheel 7 pressing yieldingly against the periphery of the wheel 8 and this latter being adjustable across the face of the disk 7 from rim to hub and vice versa in order to vary the speed.

Upon the lower end of the spindle 3 is loosely mounted a sleeve 9, which is sustained in position on the spindle by a collar 10 and an anti-friction ring 11 lying between the collar and sleeve, see Fig. 16. At its upper end the sleeve is formed with a flange 12 and loosely resting upon such end of the sleeve is a series of removable weights 13, see Fig. 14. The sleeve may also be held in position by collars 14, fixed to the spindle. The said sleeve slidably fits a guide 15 forming part of a bracket 15ª adjustably mounted upon the standard 1. Formed upon the exterior of the sleeve is a rack 16, and mounted fast upon a pin 17 in the guide 15 is a pinion 18 which meshes with the rack. Also mounted fast upon the pin 17 is a ratchet wheel 19 and a hand-wheel 20, see Fig. 17, and upon the guide 15 is pivoted a pawl 21, this latter being designed to engage the teeth of the ratchet wheel and prevent the movement of the sleeve in a downward direction, and also to sustain the weight of the sleeve, spindle and weights, or free such wheel and allow the weights to exert their force upon anything placed below the spindle.

To the lower end of the spindle 3 is connected the object by which the test is to be made. This object will usually be a long metal tube 22 of uniform diameter and thickness throughout, and such tube will be held to the spindle end by a cotter or other suitable means by which it will both rise and fall with the spindle and also be rotated with and by the spindle, see Figs. 2 and 16.

Below the spindle and adjustably secured to the standard 1 is a slide 23 formed in one with which is a laterally extending bracket 24. To this bracket is secured a dish-like table 25. Upon the bracket 24 is mounted a block 26 held to the bracket in any suitable manner but say by being formed with a round boss 26ª adapted to fit an opening in the bracket and held in such opening by a set bolt 25ᵇ, see Figs. 1 and 3. Carried by the block 26 is a tool holder, see Figs. 5, 6 and 7, comprising a vise piece 27 and an adjustable jaw 28, between which is mounted the tool 29 to be tested. Forming part of or attached to the vise piece 27 is a cross-bar 30, which at each end is beveled off to form knife edges, see Figs. 5 and 10. Secured to the block 26 are two upstanding members 31 which at their upper ends are formed with angular or elbow recesses 32, see Fig. 5. In these recesses lie the knife edges of the tool-holder cross-bar 30.

At one end the tool holder is provided with a screw-threaded rod 33, whereon is mounted a nut or balance weight 34, the tool holder, rod and weight constituting a form of steel-yard. To the other end of the tool holder may be applied a further but shorter screw-threaded rod 35, upon which may be a further balance weight 36, and to which may be connected the piston 37 of an oil dash-pot 38, this being provided for the purpose of preventing the too rapid movements of the tool holder about the knife edges.

The upper part of the block 26 overhangs the tool holder and in such parts is an opening, the axial center of which coincides with the axial center of the test tube and spindle. Within such opening is a hard steel bush 26ᶜ and through such bush loosely projects the lower end of the test tube 22, see Fig. 5.

The position of the tool holder relatively to the over-hanging part of the block is such that with the test tool in the holder its cutting edge can be set transversely of the lower edge of the tube, see Fig. 6. Under the influence of the weight 34 on the rod 33, the cutting edge of the tool is yieldingly held against the tube end, the pressure of the tool being readily varied by adjustment of the weight 34 to a scale marked on a blade 39 carried by the rod 33. The weight 36 applied to the rod 35 serves to balance the tool holder upon its knife edges when the weight 34 is at the zero point of the scale.

Immediately below the overhanging part of the block 26 and adjustably fitting an opening in the block, is a, by preference, reversible bar 40, which at one end lies immediately below the test tube, and, with the test tube, spindle and weights not otherwise supported, takes the weight of such parts. Such bar projects below only a portion of the end of the test tube, the other portion being exposed for the tool 29 to act upon. Below the tool is a set-screw 29ª by which the tool may be adjusted vertically and supported, see Fig. 5. Prior to making a test the top face of the bar 40, the cutting edge of the tool 29, and the knife edges of the cross-bar 30, all lie level with each other, see Fig. 5.

In proceeding to carry out a test the tool to be tested is placed in the holder and its cutting edge caused to press upward against the lower end of the test tube, which is allowed to press upon the bar 40 under the pressure of the weights 13, which are sufficient to effectually resist all tendency of the tube to rise under the pressure of the tool. The machine is then started, thereby causing the test tube to be rotated. Under such conditions the tool then cuts the tube while the tube is fed with an even pressure against the bar, which being fixed insures of the same conditions being maintained throughout the test, i. e., until the tube is cut away or until the tool ceases to cut. With the tool acting transversely of the tube end, the area or cross-section of the surface acted upon by the tool is constant. As soon as the tool becomes so blunt that the pressure against the tube is just insufficient to cause it to penetrate the metal of the tube, the tube will slip over the tool without further cutting and the test will be at an end.

By observing the length of tube cut away before the tool becomes blunt, or by noticing the time taken for cutting a given length of tube, a test may be obtained of the relative efficiency of cutting tools of various angles, qualities of metal, etc. In order, however, to obtain a permanent record of the test, and also to obtain a record of other data such as the number of rotations of the tube and the "rate" of cut, the machine also comprises autographic recording devices. These consist, preferably, of a rotary drum 41, surrounded by a sheet of ruled paper, and a recording pen or pencil 42. The drum, rotatably mounted on a vertical spindle in a bearing 43, is driven through suitable gearing by the spindle 3. The pencil is mounted on a rod 44 working in guides 45 fixed to the standard 1, the pencil being adjustable in order that its point may be caused to yieldingly bear upon the drum or lie clear of the drum. The rod 44 is connected to the sleeve 9 by a flexible inextensible band 46 working over pulleys 47, so that, as the sleeve, and with it the test tube, moves downward, the movement is transmitted to the pencil, which is thereby caused to rise and mark the paper on the drum, the pencil point usually being set opposite the zero point of the diagram at the start of each test. With the pencil moving vertically at a rate corresponding with that at which the test tube is cut away, and with the drum rotating at a rate proportionate to that of the test tube, it will be seen that a line will be marked on the drum diagram which in relation to the transverse and longitudinal lines drawn thereon (see Fig. 15) representing inches and revolutions, will constitute a record of the length of tube cut away and the number of revolutions of the tube for such length, while by observing the slope of the line, the rate of cut may also be ascertained.

To allow of a comparatively long test being recorded on a small drum, the rod 44 is supported from the band 46 by a pulley 48, the end of the band being fixed. By such an arrangement the vertical movement of the rod 44 will be only half that of the test tube. The drum is also geared down. For an extra long test or for enabling a number of tests to be recorded on one long chart, a long endless strip of paper may be used passing from one drum to another, see Fig. 4.

An example of a diagram is shown in Fig. 15, the line 49 representing the result of the test. Two or more tests may be taken on the same diagram, and by a comparison of one test with another the differences in, say the cutting efficiency of tools of the same metal but of different angles, or tools of different metal, but the same angle, may be readily observed. In comparing one quality of steel with another it is necessary that all the conditions of the test, namely the speed of rotation of the tube, the hardness of the tube, the pressure of the tool on the tube, and the cutting angle of the tool should be constant. But a variation in any of these conditions would affect the rate at which the tube was cut. This rate is indicated by the slope of the line on the diagram which thus affords a check on the uniformity of the conditions. By varying the speed of rotation of the tube the suitability of various steels for cutting at high or low speeds may be ascertained. By observing the rate of cutting with tools having various cutting angles the best angle can be determined.

For the purpose of conveniently ascertaining the speed of rotation of the test tube so as to adjust it to any required speed, a direct reading speed indicator may be coupled to the driving shaft. Alternatively, a toothed wheel 50 on the speed-reducing gear spindle 51 may be provided, adapted to actuate the striker 52 of a bell 53, the striker being mounted on a stud 54 and bearing against the wheel 50 through the medium of a small pin 55 under the pull of a spring 56. For say every 10 revolutions of the test tube, the bell is struck once, thereby enabling the counting of the number of revolutions of the tube in a given space of time such as a minute. The spring 56, connected at one end to the striker is connected at its other end to a fixed stud, or, by preference, to a stud 57 eccentrically arranged on the face of a disk 58 carried by a rod 59, which latter at its lower end is provided with a small thumb lever 60 whereby the rod may be rotated in one direction and the spring put in tension, or whereby the rod may be rotated in the reverse direction and the spring allowed to become slack and the striker inoperative. To further facilitate the speed regulation of the machine a pendulum may be provided and such pendulum may take the form of a flexible steel tape 61 and a weight 62, see Figs. 20 and 21, the tape being drawn out of a casing 63 carried by a bracket or arm 64 fixed to the machine standard. The bracket is provided with a bifurcated pin 65 between the bifurcations of which the tape passes, and also with a guide 66 by which the weight 62 is held when the tape is wound into the casing 63. By drawing the tape out for a certain distance and setting the weight and tape in motion pendulum fashion and then setting the speed of the machine until the strokes of the bell "time" exactly with the swings of the tape or pendulum, the machine can be set to run at a desired speed.

In order to ascertain the resistance to cutting and to provide data for calculating the power consumed in cutting with tools of various angles, the tool holder is mounted on a vertical pivot as well as on horizontal pivots, see Figs. 18 and 19. That is to say, the uprights 31 of the holder, instead of being secured to the block 26, are secured to or formed in one with a plate 31$^a$, which on its underside is provided with a cone 31$^b$, arranged to rotate on ball bearings let into the face of the block 26. The abutment bar 40 shown in Fig. 7 is dispensed with, and in its place is used a rod 67 designed to project up through the block 26 and lie with its upper end (one half of which is cut away to allow room for the tool) below the test tube, see Fig. 18. The rod 35 is also disconnected from the dash pot spindle 37, or the dash pot is made to slide with the rod. Secured to the plate 31$^a$ is a small bracket 68, the front end of which is pointed. Pivoted to such bracket is a screw-threaded rod 69. This rod projects loosely through a staple 70 fixed to the block 26, and encircling the rod and lying between the staple and a sleeve 71 is a spring 72. Also upon the rod is a nut 73 by adjusting which the compression of the spring 72 may be increased or decreased. 74 is a fixed stop against which the plate 31$^a$ normally bears before or after a test under the tension of the spring 72. To the block 26 and immediately below the level of the rod 69 is secured a plate 75 whereon is marked suitable divisions 75$^a$ representing measurements of force. Overlying such marked portion of the plate is a pointed portion of the sleeve 71 which thereby acts as a pointer, see Fig. 19. To prevent the sleeve 71 rotating with the nut 73, the rod 69 may be grooved and the sleeve have a small pin engaging the groove. Upon the plate 75 is a further notch or mark 75$^b$ which lies immediately below the pointed part of the bracket 68. When the tool holder is in its correct working position the point of the bracket lies directly over the mark 75$^b$.

Prior to making a test the nut 73 is slacked back until the sleeve point lies directly opposite the zero mark of the scale on the plate 75, the rod 69 and bracket 68 being then at rest and unaffected by the spring 72. The machine being started the tube 22 exerts a turning movement on the tool and tool holder. In making the said turning movement the tool holder causes the bracket 68 to move away from the mark 75$^b$. The nut 73 is then tightened up until the point of the bracket 68 again lies over the mark 75$^b$. By these adjustments the amount of power absorbed in cutting can be readily determined by observing the position of the sleeve point on the scale marked on plate 75.

The test tube 22 may be formed out of a solid rod 22$^a$ during the progress of the test, see Fig. 7. In this case the point of a drill 76 will be caused to project upward through an opening in the block 26 and bar 40, and the drill will be of such a size as to drill out the center of the rod and leave a tube of the required thickness. The drill, which will be stationary, will drill only as the rod (tube) is cut away by the tool and the rod will descend under the influence of the weights 13. In other cases the tube may be formed beforehand by drilling, or by winding a flat strip of metal into the form of a closed helix.

In Figs. 7 and 8 a pointer 77 is shown secured to the cross bar 30 and movable therewith, and in the block 26 is a fixed and notched bar 78 whereby the tool holder may readily set in a horizontal position. When the block 26 embodies the torque and power-indicating devices shown in Fig. 18, the pointer 77 will be shortened and the bar 78 will be fixed to the plate 31$^a$, see Fig. 18.

If desired, means may be provided for setting the depth of the cut positively, instead of setting it indirectly by regulating the pressure of the tool on the test tube. Such means may consist of a bracket 79 secured to the standard 1, and of a screw so carried by the bracket, see Figs. 3 and 11. Such screw bears on an extension 81 of the tool holder, and thereby causes the holder to tilt about its pivot and raise the cutting edge of the tool above the surface of the bar 40 by a definite distance, which will represent the depth of cut and will be indicated by the slope of the line drawn on the diagram.

It is often desirable to measure the wear of the tool while the test is in progress and to discontinue the test as soon as a predetermined amount of wear has taken place. This is provided for by means of a micrometer screw 82 which is set in contact with the extension 81 of the tool holder at the commencement of the test. The screw 82 is then retired by a certain distance corresponding to the predetermined amount of wear of the tool, the proper distance being measured by graduations of a dial 83, see Fig. 13, in conjunction with a finger 84, see Fig. 12. As the tool wears, the tool holder tilts about its pivot under the influence of the weight 34, which tilting causes the extension 81 to approach the screw 82. When the predetermined amount of wear has taken place the extension 81 makes contact with the screw 82 and the test is at an end. The bracket 79 carries both screws, and is hinged to allow of its being readily swung into and out of position.

For use in testing the efficiency of lubricants or "cutting compounds" as aids to cutting, the use of first one substance between the tool and tube and then another and different substance will cause a variation of results, which, being recorded on a diagram, will furnish a test of the qualities of one lubricant against those of another.

In testing a lubricant the tank 87 is provided for holding a supply of the lubricant, see Fig. 1. To such tank is fitted a pump 88, and leading from the pump up through block 26 is a pipe 89 for conveying the lubricant to a point where, under the pressure of the pump, it issues in the form of a jet. This jet is delivered up into the test tube and on to the tool, and after use falls back into dish 25 and from thence through a suitable strainer and pipe 90 back into the tank 87.

The end of the rod 33 will be provided with a plate 33$^a$ formed to support the blade 39 and such plate will also be formed as a hook to support a loose weight or weights 91 which will serve to give the main pressure of the tool against the tube while the weight 34 will give the finer adjustment of the pressure.

The bracket 15$^a$ is capable of being slid up or down the V face of the standard to suit various lengths of test tubes and is held by a clamp 15$^b$.

While preferring the test tube and tool to be arranged and to operate respectively as hereinbefore described it will be understood that they may be arranged and operate in other ways while still fulfilling the aforesaid conditions necessary for a test. In Figs. 22 to 24 we show a series of variations, in all of which the same conditions of the test are present.

In Fig. 1 the test tube is rotated and fed to the tool while the tool is stationary. In Fig. 22 the test tube is stationary while the tool is rotated and fed to the tube. In Fig. 23 the test tube rotates only and the tool is fed to the tube. In Fig. 24 the tool rotates only and the test tube is fed to the tool.

In Fig. 22 the test rod 22 is held stationary, and the block 26 and tool rotate around the tube, the tool resting upon the end of the tube. The spindle or drill 76, which is rotated, carries a lateral arm 76$^a$ which presses against an upstanding projection 26$^a$ on the block 26 thereby rotating the block and tool, which latter cuts into the tube by reason of the weight of the block and any adjustable weights such as 34 added thereto.

In Fig. 23 the test tube is rotated as in Fig. 1, and the tool is carried by a tubular holder 92 slidably fitting the tube and under the pull of weights 93 pressing with a constant force against the tube end, any variation of the pressure being effected by the addition or removal of the weights.

In Fig. 24 the test tube is supported in guides 94 and fed longitudinally by weights 95. The tool is held by a lever 96 pivotally secured to a rotary block 97 carried by a rotary spindle 98, the pressure of the tool against the tube end being regulated by an adjustable weight 99 on the lever. The block 97 forms an abutment for the tube.

It will be understood that the word "tube" is meant to include objects having like properties to a tube in regard to uniformity of thickness and in offering a continuous face for the tool to act upon when rotated or traversed and which allow of the before-named conditions in making a test.

What we claim is:—

1. A machine for the purpose described comprising a tube, means for holding the tube, means for holding the tool to be tested and allowing of the pressure of the tool being regulated, means for producing rotation of the tube with respect to the tool, and means for feeding the tube endwise against the tool to cause the entire end section of the tube to be cut away, two screws, means for supporting the screws, a dial on one of such screws, an indicator fixed to the screw support and the points of the screws being adapted to act respectively in opposite directions upon the tool holder, substantially as herein set forth.

2. A machine for the purposes described comprising a tube, means for holding the tube, means for holding the tool steel to be tested, means for rotating one of said parts, a fixed abutment, and means for causing the tube end as it is cut away to bear against the abutment.

3. A machine for the purposes described comprising a tube means for holding said tube, means for rotating the tube holder and tube, a fixed abutment, means for moving the tube against such abutment, and means for holding the tool steel to be tested with a known pressure against the tube and allowing such pressure to be regulated.

4. A machine for the purposes described comprising a tube means for holding the tube, means for holding the tool steel to be tested, means for rotating one of said parts, a fixed abutment, means for causing the tube end as it is cut away to bear against the abutment, and means for varying the speed of rotation.

5. A machine for the purpose described comprising a holder for holding the tool steel to be tested and such holder adapted to hold the said object with a known pressure against the element used in effecting a test, and also adapted to allow of the pressure being regulated in combination with two screws arranged point to point, means for supporting the screws, a dial on one of such screws, an indicator fixed to the screw support and the points of the screws being adapted to act respectively in opposite directions upon the tool holder whereby an indication may be given when a predetermined degree of bluntness of the tool has been reached.

6. A machine for the purposes described comprising a test element, means for rotating such element, a holder for holding the object to be tested against the test element, pivot supports about which the tool holder is adapted to rotate in a vertical plane, a supporting plate for said pivots and means whereby the plate may rotate in a horizontal plane, a fixed base part for the plate, a spring and supporting means therefor, the rotation of the plate in one direction serving to compress the spring, and means for indicating the degree to which the plate rotates when subjected to the turning movement or torque produced by the rotation of the test element.

7. In a machine for the purposes described, means for holding a test tube, a holder for the cutting tool to be tested, means whereby the tube and tool are caused to coact to effect a cutting operation by which a test is made, and a relatively fixed abutment against which the end of the tube acted on by the tool is held as the test proceeds, autographic recording devices, means for rotating the tube, means for moving the tube longitudinally, means for transmitting the rotary movements of the test tube to one element of the recording devices, and further means for transmitting the longitudinal movements of the tube to the other element of the recording devices.

8. In a machine for the purposes described, means for holding a test tube means for rotating the tube, means for feeding the tube longitudinally, a fixed abutment against which one end of the tube is held, means for holding a cutting tool of the steel to be tested, supporting means for the holder, the tool acting transversely against that end of the tube which is held against the fixed abutment, as set forth.

9. In a machine for the purposes described, means for holding a test tube, means for rotating the tube, means for feeding the tube longitudinally, a fixed abutment against which one end of the tube is held, means for holding a cutting tool of the steel to be tested, supporting means for the holder, the tool acting transversely against that end of the tube pressing against the fixed abutment and means for varying the speed of the tube, as set forth.

10. In a machine for the purposes described, means for holding a test tube, means for rotating the tube, means for feeding the tube longitudinally, a fixed abutment against which the end of the tube is held, means for holding a tool of the steel to be tested, supporting means for the holder, the tool acting transversely against that end of the tube pressing against the fixed abutment, means for varying the speed of the tube, autographic recording devices, means for transmitting the rotary movements of the test tube to one element of the recording devices, and further means for transmitting the longitudinal movements of the tube to the other element of the recording devices, as set forth.

11. In a machine for the purposes described, means for holding a test tube and rotating it, means for feeding the tube longitudinally, a fixed abutment against which one end of the tube is held, a holder for a cutting tool of the steel to be tested, supporting means for the holder, the tool acting transversely against that end of the tube which is held against the fixed abutment, means for varying the speed of the tube, and means whereby the tool engages the tube with a known pressure and whereby such pressure may be measured and regulated, as set forth.

12. In a machine for the purposes described, means for holding a test tube and rotating it, means for feeding the tube longitudinally, a fixed abutment against which the end of the tube is held, a holder for a tool of the steel to be tested, supporting means for the holder, the tool acting transversely against that end of the tube pressing against the abutment, means for varying the speed of the tube, means whereby the tool engages the tube with a known pressure and whereby such pressure may be measured and regulated, autographic recording devices, means for transmitting the rotary movements of the test tube to one element of the recording devices and further means for transmitting the longitudinal movements of the test tube to the other element of the recording devices, as set forth.

13. In a machine for the purposes described, means for holding a test tube and rotating it, means for feeding the tube longitudinally, a fixed abutment against which one end of the tube is held, a holder for a tool of the steel to be tested, supporting means for the holder, the tool acting transversely against that end of the tube pressing against the fixed abutment, means for varying the speed of the tube, and means by which the wear of the tool may be measured during the test, as set forth.

14. In a machine for the purposes described, means for holding a test tube and rotating it, means for feeding the tube longitudinally, a fixed abutment against which the end of the tube is held, a holder for a tool of the steel to be tested, supporting means for the holder, the tool acting transversely against the tube end, means for varying the speed of the tube, means whereby the tool engages the tube with a known pressure and whereby such pressure may be measured and regulated, means by which the wear of the tool may be measured during the test, autographic recording devices, means for transmitting the rotary movements of the test tube to one element of the recording devices, and further means for transmitting the longitudinal movements of the tube to the other element of the recording devices, as set forth.

15. In a machine for the purposes described, a fixed block, a tool holder for holding a tool to be tested, means for pivotally supporting the holder on the block, a fixed abutment carried by the block, the top face of the abutment, the cutting edge of the tool, and the pivot supports being on a level with each other when the tool is in its working position, as set forth.

16. In a machine for the purposes described, a tool holder, a tool holder support, uprights on the support on which is pivotally supported the tool holder, a block carrying the support and forming a vertical bearing therefor about which the tool-holder support may oscillate horizontally, a spring for resisting such oscillations, means for adjusting the spring, and pointers and scales for indicating the torque on the test member as set forth.

17. In a machine for the purposes described, a spindle adapted to support a test tube, a bearing in which the spindle may rotate and move vertically, means for rotating the spindle and tube, a fixed bar against which the tube may press, weights for holding the tube against the bar, a tool holder and pivot supports therefor, and means for holding a tool in said holder against the tube end with a known pressure, as set forth.

18. In a machine for the purposes described, a standard, a spindle adapted to receive a test tube and capable of rotating and moving vertically in the upper part of said standard, a sleeve on the spindle having a rack on its exterior, weights upon the sleeve, a slide upon the standard, a table carried by the slide and extending below the test member, a block carried by the table and having an overhanging part in which is an opening, an element carried by the block below its overhanging part and against which the test member bears, substantially as herein set forth.

19. In a machine for the purposes described, a tool holder, pivot supports for such holder, two screws arranged point to point, means for supporting the screws, a dial on one of such screws, an indicator fixed to the screw-support and the points of the screws being adapted to act respectively in opposite directions upon the tool holder, as set forth.

In witness whereof we have hereunto set our hands in the presence of two witnesses.

EDWARD G. HERBERT.
CHAS. FLETCHER.

Witnesses:
P. D. BAILEY,
JAS. STEWART BROADFOOT.